Dec. 13, 1938. A. D. SLACK ET AL 2,139,778

ANTISTATIC PHOTOGRAPHIC FILM

Filed March 1, 1938

FIG. 1.

12 — EMULSION
11 — GELATIN CONTAINING SULFONATED AMIDE
10 — NITRATE SUPPORT

FIG. 2.

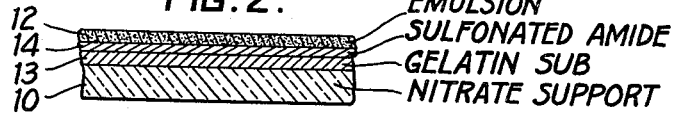

12 — EMULSION
14 — SULFONATED AMIDE
13 — GELATIN SUB
10 — NITRATE SUPPORT

FIG. 3.

12 — EMULSION
16 — SYNTHETIC RESIN & GELATIN CONTAINING SULFONATED AMIDE
15 — ACETATE OR MIXED ESTER SUPPORT

FIG. 4.

12 — EMULSION
11 — GELATIN CONTAINING SULFONATED AMIDE
17 — SYNTHETIC RESIN AND GELATIN
15 — ACETATE OR MIXED ESTER SUPPORT

FIG. 5.

12 — EMULSION
11 — GELATIN CONTAINING SULFONATED AMIDE
15 — CELLULOSE ESTER SUPPORT
11 — GELATIN CONTAINING SULFONATED AMIDE
12 — EMULSION

FIG. 6.

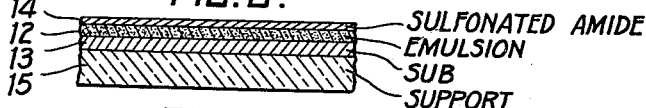

14 — SULFONATED AMIDE
12 — EMULSION
13 — SUB
15 — SUPPORT

FIG. 7.

14 — SULFONATED AMIDE
19 — EMULSION LAYER CONTAINING IMAGE
18 — SUB
13 — SUPPORT
15 —

FIG. 8.

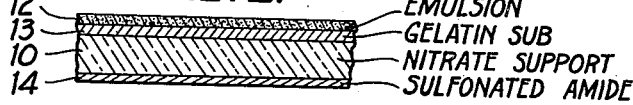

12 — EMULSION
13 — GELATIN SUB
10 — NITRATE SUPPORT
14 — SULFONATED AMIDE

FIG. 9.

20 — EMULSION CONTAINING SULFONATED AMIDE
11 — SUB CONTAINING SULFONATED AMIDE
10 — NITRATE SUPPORT

FIG. 10.

20 — EMULSION
13 — SUB
15 — SUPPORT
21 — ANTI-HALATION BACKING CONTAINING SULFONATED AMIDE

Alfred D. Slack & Albert A. Young
INVENTORS

BY Newton M. Perrins
R. Frank Smith
ATTORNEYS

Patented Dec. 13, 1938

2,139,778

UNITED STATES PATENT OFFICE 2,139,778

ANTISTATIC PHOTOGRAPHIC FILM

Alfred D. Slack and Albert A. Young, Rochester, N. Y., assignors to Eastman Kodak Company, Rochester, N. Y., a corporation of New Jersey Application March 1, 1938, Serial No. 193,302

12 Claims. (Cl. 95—9)

This invention relates to photographic film and, more particularly, to film having anti-static coatings.

This application is a continuation in part of application Serial No. 41,417, filed September 20, 1935, now Patent No. 2,118,059, May 24, 1938.

A great amount of trouble is caused during the manufacture or use of photographic film on account of the accumulation of the electrical charges on the film. These electrical charges are known as static and may be caused by friction of the film against the rolls or other portions of the machines through which it passes or merely by contact with dissimilar surfaces, these and other causes being known to those skilled in its manufacture. Static discharges in an unexposed film manifest themselves by the formation of irregular streaks or lines caused by exposure of the emulsion at such portions. Static charges are also objectionable in finished film and cause an increase in the friction in the film against the gates of a projector or other parts of the mechanism through which the film passes. Attempts to overcome static in photographic films have, for the most part, followed the lines of applying conducting or hygroscopic materials to the surface of the film in order to increase its electrical conductivity.

The principal object of the present invention is to provide an improved means for reducing friction, in some cases giving both surfaces a common identity and thus eliminating the static charges on a photographic film. A further object is to provide means for reducing the static in a photographic film base during coating of the sensitive emulsion. A still further object is to provide means for reducing static in a photographic film during passage through a camera or printing machine.

These objects are accomplished by the present invention by incorporating in layers of the film or on the surface of the film, certain types of sulfonated amides as described more fully hereinafter.

The materials which we use to prevent the formation of static charges on the film consist of sulfonated amides having at least 8 carbon atoms in the molecule. These compounds are described in U. S. Patent No. 1,932,180 and are sold under various trade-names, such as "Igepon T" and "Artic Syntex T". The production of these materials forms no part of our invention.

The compounds which we contemplate using are sulfonated compounds formed from certain organic acid components by reaction with certain ammonia bases, such as taurine or taurine bodies. Among the organic acids which may be used are acids of vegetable origin containing 8 to 16 carbon atoms, such as the oils derived from soya bean, linseed, cotton-seed, peanuts, and cocoanuts. These oils produce acids such as oleic, linoleic, capric, lauric, palmitic, stearic, etc. Lower fatty acids, such as acetic, propionic and butyric may also be used but the total number of carbon atoms in the resulting amide must be at least 8. The ammonia bases used include taurine and taurine bodies, such as N-methyl, N-ethyl, N-butyl, N-cetyl, N-cyclohexyl, or N-phenyl taurine. A typical reaction for the formation of one of these amides, using oleic acid chloride and N-methyl sodium taurine would be as follows:

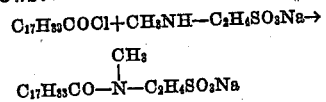

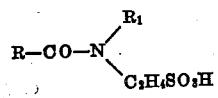

The compounds which we use consist, therefore, of sulfonated amides which are taurides containing sulfonic derivative radicals corresponding to the formula $$R-CO-N\diagdown_{C_2H_4SO_3H}^{R_1}$$

in which R—CO denotes a radical of a fatty acid of vegetable origin, and

R₁=Hydrogen,
an aliphatic straight-chain radical,
an aliphatic-aromatic radical,
an aromatic radical.

In these taurides the sulfonic acid need not be in the free state as indicated in the above formula but the final products may be neutralized by alkalies or organic bases of any kind which do not adversely affect the photographic emulsion or film. Where we refer in the claims to "sulfonic derivative radicals" it is to be understood that we intend to embrace the acid groups in the free state as well as in the salt form.

We contemplate applying the taurides to the film in various ways to decrease or eliminate static. They may be applied (1) as a constituent of a gelatin sub-layer or as a coating over a gelatin sub-layer applied to the base, (2) to the finished film either on the back, over, or in the sensitive emulsion, or (3) to either surface of the exposed and developed film. The various ways of applying these materials, according to our invention, will now be described with particular reference to the accompanying drawing.

As shown in Fig. 1 a film base 10 of transparent material such as cellulose nitrate, is coated with a thin gelatin sub-layer 11 to which has been added a sulfonated amide. The sensitive emulsion layer 12 is coated directly over this gelatin layer containing the amide. In the modification shown in Fig. 2, the base 10 is coated with the usual gelatin sub-layer 13 and directly over this is coated a solution of the sulfonated amide 14. The sensitive emulsion 12 is coated directly on this layer 14. Fig. 3 illustrates a film base of a cellulose ester, such as cellulose nitrate, or a mixed ester, such as cellulose acetate propionate 15, coated with a sub-layer 16 which is a mixture of a synthetic resin and gelatin containing a sulfonated amide, on which is coated the sensitive emulsion layer 12. The anti-static layer may also be coated as a separate layer in this case, as shown in Fig. 4, in which 17 represents a sub-layer comprising a mixture of a synthetic resin and gelatin having coated thereon a layer 11 of gelatin containing a sulfonated amide. The sensitive emulsion layer 12 is coated on this latter layer.

In the modification shown in Fig. 5 the base 15 of cellulose ester is coated on both sides with a layer 11 of gelatin containing a sulfonated amide. The sensitive emulsion layers 12 are coated on these anti-static layers 11. We have found that the static formed in a film coated on both sides is materially reduced when coating the second sensitive emulsion layer, of one of the anti-static materials used, according to our invention, previously applied to the film.

In Fig. 6 there is shown a film consisting of a support 15 which may be of cellulose ester or other suitable material, coated with the usual gelatin sub-layer 13 and sensitive emulsion layer 12. The anti-static layer 14 consisting of the sulfonated amide solution is coated over the sensitive emulsion layer 12. As shown in Fig. 7, the emulsion layer has been exposed and developed to form a silver image 19 therein and the finished film is then coated with a layer 14 of a sulfonated amide.

The anti-static layer may be applied to the side of a film opposite to that bearing the sensitized emulsion surface, as shown in Fig. 8, in which 10 represents a nitrate film support having the usual gelatin sub 13 and emulsion layer 12 coated on one side thereof. The anti-static layer 14 consisting of a solution of a sulfonated amide is coated on the opposite side of the film support 10.

The anti-static material may also be mixed with the sensitive emulsion, as shown in the modification of Fig. 9, in which 10 is the usual nitrate film base and is coated with a sub-layer 11 which may consist of gelatin and a sulfonated amide. On this sub-layer 11 there is coated the emulsion layer 20 containing a sulfonated amide.

The amide may also be coated on one or both sides of a support composed of a cellulose mixed ester base having cellulose nitrate layers on both sides. Supports of this combination type are used to secure advantages not present in a base composed of a single cellulose ester, and the anti-static material used according to our invention may be coated directly on this support, or may be applied in gel subs coated on it. The emulsion and backing layers are then applied in the usual manner.

Fig. 10 illustrates an anti-halation film backing containing a sulfonated amide as an anti-static material. As shown in Fig. 10, 15 is a film base of cellulose acetate or mixed ester coated with a gelatin sub-layer 13 and emulsion layer 20. The anti-halation layer 21 containing a sulfonated amide is coated on the opposite side of the film base 15. The sulfonated amide used as an anti-static material, according to our invention, may be applied to the film either in a solvent or in a non-solvent for the film base. Where it is applied in a mixture with the sensitive emulsion, or over, or in a layer adjacent to a sensitive emulsion, it will obviously be applied in a solution which does not adversely affect the sensitive emulsion. The anti-static materials may be applied, for example, in an aqueous solution or a solution of a hydrocarbon, such as benzene or toluene or in a solution of an alcohol, such as methyl, ethyl, or higher alcohol, or in any other suitable organic solvent, such as methyl Cellosolve. These organic solvents do not generally dissolve the salts of the amides, but the water-soluble solvents may be used in combination with water in solutions of the salts, as indicated below.

The following specific examples will illustrate methods of applying the anti-static materials to the film, according to our invention, it being understood that these examples represent preferred embodiments, but are not to be considered as limiting our invention thereto.

*Example I*

A sensitive photographic film having on one side thereof the usual sensitive emulsion layer is coated on its opposite side with a solution of an anti-static backing consisting of the oleic acid amide of N-methyl sodium taurine in a solvent which has very little solvent action for the film base. This solution has the following composition:

| | G. |
|---|---|
| Oleic acid amide of N-methyl sodium taurine | 3 |
| Water | 24 |
| Methyl Cellosolve | 49 |
| Methyl alcohol | 24 |

*Example II*

A film is made as in Example I, using the following backing solution:

| | G. |
|---|---|
| Oleic acid amide of N-methyl sodium taurine | 3 |
| Water | 20 |
| Ethyl lactate | 25 |
| Methyl alcohol | 52 |

*Example III*

A film is made as in Example I, using the following backing solution:

| | G. |
|---|---|
| Oleic acid amide of N-ethyl sodium taurine | 1 |
| Water | 30 |
| Ethyl oxybutyrate | 15 |
| Ethyl alcohol | 54 |

(The formula for ethyl oxybutyrate is

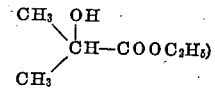

)

*Example IV*

A film is made as in Example I, using the following anti-static coating solution:

| | G. |
|---|---|
| Oleic acid amide of N-ethyl sodium taurine | 3 |
| Water | 29 |
| Isopropyl alcohol | 68 |

It is to be understood that various types of photographic film base may be used in place of cellulose nitrate or cellulose acetate propionate, such as cellulose acetate, cellulose acetate butyrate, etc., and that our invention is not to be considered as limited to the specific method of applying the anti-static materials as described in our specification. The anti-static materials used according to our invention may be applied to photographic film in numerous ways not herein specifically described. Our invention is to be considered as limited only by the scope of the appended claims.

What we claim is:

1. A photographic element comprising a support carrying a photographic emulsion layer and an anti-static layer comprising a tauride containing sulfonic derivative radicals corresponding to the formula

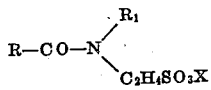

wherein R—CO denotes a radical of a fatty acid of vegetable origin, R₁ is selected from the group of hydrogen, aliphatic straight-chain radicals, aliphatic-aromatic radicals, and aromatic radicals, and X is selected from the group of hydrogen, alkali metals, and organic base radicals, in which tauride the total number of carbon atoms is at least eight.

2. A photographic element comprising a support carrying a photographic emulsion layer and an anti-static layer comprising a tauride containing sulfonic derivative radicals corresponding to the formula

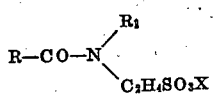

wherein R—CO denotes a radical of a fatty acid of vegetable origin, and R₁ is an alkyl radical, and X is selected from the group of hydrogen, alkali metals, and organic base radicals, in which tauride the total number of carbon atoms is at least eight.

3. A photographic element comprising a support carrying a photographic layer and an anti-static layer comprising an oleic N-methyl tauride having the formula

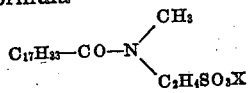

in which X is selected from the group of hydrogen, alkali metals, and organic base radicals.

4. A photographic element comprising a transparent support carrying a light-sensitive emulsion layer and an anti-static layer comprising an oleic N-methyl tauride having the formula

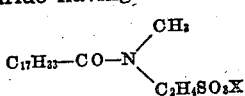

in which X is selected from the group of hydrogen, alkali metals, and organic base radicals.

5. A photographic element comprising a transparent support carrying a light-sensitive emulsion layer and an anti-static layer comprising a tauride containing sulfonic derivative radicals corresponding to the formula

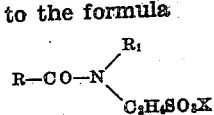

wherein R—CO denotes a radical of a fatty acid of vegetable origin, R₁ is an alkyl radical, and X is an alkali metal radical, in which tauride the total number of carbon atoms is at least eight.

6. A photographic element comprising a transparent support carrying a light-sensitive emulsion layer and, between said support and said emulsion layer, an anti-static layer comprising a tauride containing sulfonic derivative radicals corresponding to the formula

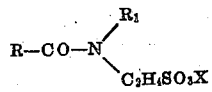

wherein R—CO denotes a radical of a fatty acid of vegetable origin, R₁ is an alkyl radical, and X is an alkali metal radical, in which tauride the total number of carbon atoms is at least eight.

7. A photographic element comprising a support carrying a photographic emulsion layer and, on the opposite side of said support, an anti-static layer comprising a tauride containing sulfonic derivative radicals corresponding to the formula

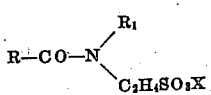

wherein R—CO denotes a radical of a fatty acid of vegetable origin, R₁ is selected from the group of hydrogen, aliphatic straight-chain radicals, aliphatic-aromatic radicals, and aromatic radicals, and X is selected from the group of hydrogen, alkali metals, and organic base radicals, in which tauride the total number of carbon atoms is at least eight.

8. A photographic element comprising a support carrying a photographic emulsion layer and, on the opposite side of said support, an anti-static layer comprising a tauride containing sulfonic derivative radicals corresponding to the formula

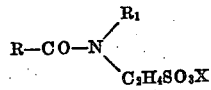

wherein R—CO denotes a radical of a fatty acid of vegetable origin, R₁ is an alkyl radical, and X is an alkali metal radical, in which tauride the total number of carbon atoms is at least eight.

9. A photographic element comprising a transparent support carrying a photographic layer and, on the opposite side of said support, an anti-static layer comprising an oleic N-methyl tauride having the formula

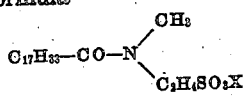

in which X is selected from the group of hydrogen, alkali metals, and organic base radicals.

10. A photographic element comprising a transparent support carrying a light-sensitive layer and, on the opposite side of said support, an anti-static layer comprising an oleic N-methyl tauride having the formula

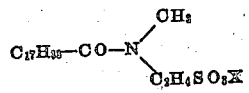

in which X is selected from the group of hydrogen, alkali metals, and organic base radicals.

11. A photographic element comprising a transparent cellulosic support carrying a light-sensitive emulsion layer on one side thereof, and on the opposite side thereof, an anti-static layer comprising a compound having the formula

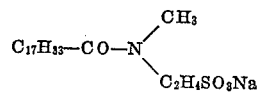

12. A photographic element comprising a transparent cellulosic support carrying a light-sensitive emulsion layer on one side thereof, and on the opposite side thereof, an anti-static layer comprising a compound having the formula

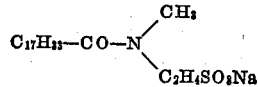

said compound being substantially only on the surface of the film support.

ALFRED D. SLACK.
ALBERT A. YOUNG.